United States Patent [19]

Caillouet, Jr.

[11] Patent Number: 4,650,221

[45] Date of Patent: Mar. 17, 1987

[54] QUICK CONNECT COUPLING SAFETY CLAMP SYSTEM

[76] Inventor: Stanford J. Caillouet, Jr., 577 W. Hoover St., Destrehan, La. 70047

[21] Appl. No.: 701,411

[22] Filed: Feb. 14, 1985

[51] Int. Cl.$^4$ ............................................. F16L 55/00
[52] U.S. Cl. ........................................ 285/87; 285/81; 285/313; 285/318; 285/320; 285/420; 24/270; 24/20 S; 24/271
[58] Field of Search ...................... 485/87, 88, 81, 82, 485/313, 318, 320, 311, 312, 407, 420; 24/270, 273, 20 EE, 20 S, 271

[56] References Cited

U.S. PATENT DOCUMENTS

| | | | |
|---|---|---|---|
| 605,238 | 6/1898 | Sutfin | 285/81 |
| 1,819,768 | 8/1931 | Coffing | 24/271 X |
| 2,018,906 | 10/1935 | Winter | 24/271 |
| 3,081,862 | 3/1963 | Knoedler | 24/270 X |
| 3,097,410 | 7/1963 | Lincoln | 24/270 |
| 3,964,774 | 6/1976 | Wollin | 285/420 X |

FOREIGN PATENT DOCUMENTS 283295 3/1931 Italy ...................................... 24/270
2036852 7/1980 United Kingdom ................ 285/420

Primary Examiner—Richard J. Scanlan, Jr.
Attorney, Agent, or Firm—C. Emmett Pugh

[57] ABSTRACT

A safety clamp system for securing the lever arms of a quick connect coupling to prevent the accidental movement of the arms which would cause a failure of the coupling mechanism for two coupling pipes. Once the pipes have been joined by a standard quick connect coupling, the clamp of the present invention is positioned to encircle the lever arms and hold them down secure against the body of the coupling. The safety clamp is separate from the coupling mechanism and is itself not an aid in the joining of the pipes. The clamp arms encircle approximately 270 degrees of the pipes circumference, making contact only at a few points about the coupling's periphery, some of the contact being flat, face-to-face surface area engagement with some "L" shaped hooking, and utilizes a resilient spring biasing hooking mechanism to prevent the separate, pipe coupling mechanism from accidently becoming undone but allowing relatively easily disengagement of the clamp from the coupling when so desired.

14 Claims, 7 Drawing Figures

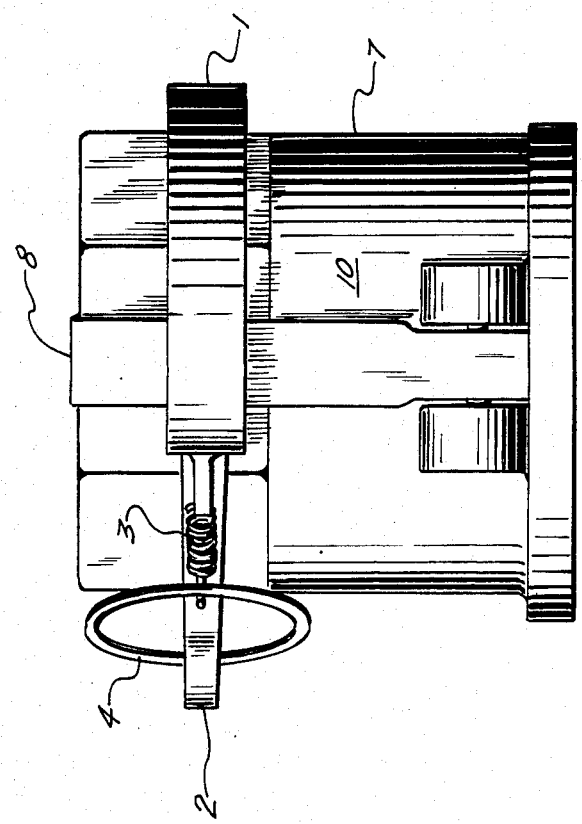
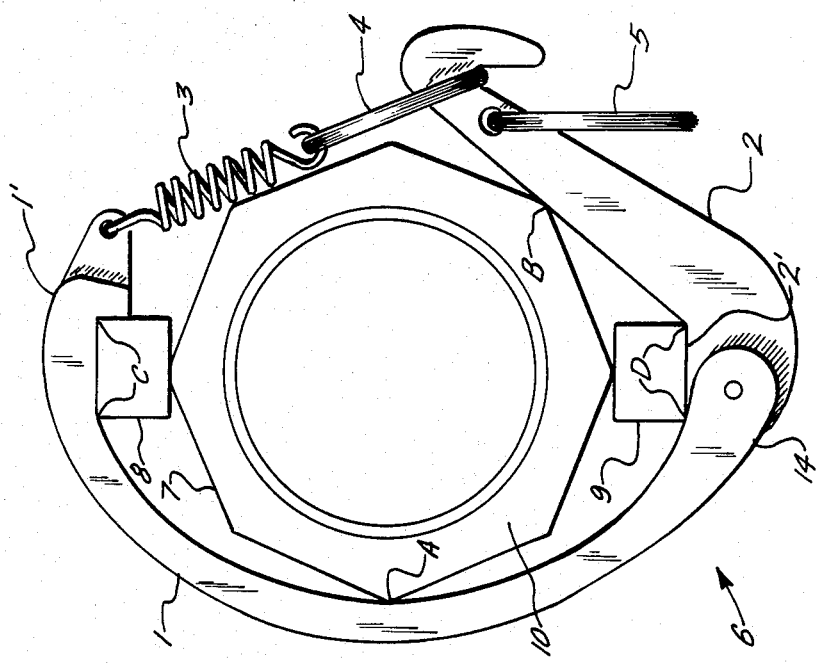

QUICK CONNECT COUPLING SAFETY CLAMP SYSTEM

BACKGROUND OF INVENTION

1. Field of Invention

The present invention relates to a system for maintaining a quick connect coupling in its coupled position. More particularly, the present invention relates to a spring biased latching means for securing the lever arms of a quick release, cam action coupling in a closed disposition.

2. Prior Art And General Background

The broad concept of using an encircling, pivoted two-piece clamp to join pipe sections together is shown in the patents to Jolliffe et al (U.S. Pat No. 196,807 issued Nov. 6, 1877), Eastman (U.S. Pat. No. 1,185,487 issued May 30, 1916), Brewer (U.S. Pat. No. 1,518,479 issued Dec. 9,1924), and Perrin et al (U.S. Pat. No. 3,828,403 issued Aug. 13, 1974). These prior art clamps, unlike the present invention, encircle a full 360 degrees of the pipe sections to be joined and are designed for a narrowly limited range of pipe diameter sizes. Additionally the clamps of the prior art are designed to accomplish the actual joining, securing and sealing of the sections of pipe. The clamps of the prior art are either designed to be of an exact preset final internal diameter as in Jolliffe et al and Perrin; or the clamps are somewhat adjustable by the use of a screw or bolt as in Eastman and Brewer.

The prior art of clamping generally shows the use of a spring to bias a 360 degree band taut around a milk crock in the patent to Bronson (U.S. Pat. No. 740,390 issued Oct. 6, 1903), once again in a application which accomplishes the sealing of the joint itself by means of a completely encircling, continuous band.

In the patent to Moore et al (U.S. Pat. No. 3,439,943 issued Apr. 22, 1969) a retainer member, not an encircling clamp, is included with one of the pivot arms to prevent the lever arm from becoming disengaged.

Other coupling patent which may be of general background interest are U.S. Pat. No. 2,033,142 and 2,518,026.

3. General Discussion of the Invention

In a quick disconnect coupling a pair of levers is pivotally mounted on a socket member for camming cooperation with a plug member to quickly attach or detach the plug and socket members. When the lever arms are in the proper position to cause the camming action to seal the coupling, either lever may be accidentally jostled from its position. If this should occur, the plug and socket members are no longer sealed, and the passage through the coupling is no longer leak proof. The present invention solves this problem by securing the lever arms with a partially encircling clamp having a biasing force, so that the lever arms can not move out of their closed dispositions without intentional disengagement of the safety clamp clamp of the present invention.

The illustrated embodiment of the present invention accomplishes this by surrounding the socket coupling housing and the two opposing lever arms. The present invention constricts the outward movement of the arms in such a manner as to hold them secure against the body of the coupling.

The clamping arms or rigid element of the preferred embodiment of the present invention, in contrast to the prior art, only encircle approximate 270 degrees of the pipe circumference, are designed to make contact only at a limited number of specific points, at least some of which have flat, face-to-face surface engagements, and is used primarily if not exclusively as a safety measure to prevent a separate pipe joining mechanism from becoming undone. The present invention utilizes a spring biasing mechanism to close off the gap between the ends of the two encircling arms and to maintain the clamp in a secure relationship with the separate coupling, causing the clamp to prevent the coupling from coming loose.

BRIEF DESCRIPTION OF THE DRAWINGS

For a further understanding of the nature and objects of the present invention, reference should be had to the following detailed description, taken in conjunction with the accompanying drawings in which like parts are given like reference numerals and wherein:

FIG. 2 is a top view of the preferred embodiment of the present invention in its closed configuration in place surrounding a coupling of the prior art and securing its lever arms.

FIG. 3 is a right side elevational view of the preferred embodiment of the present invention in securing engagement with a lever arm of a coupling of the prior art.

DETAILED DESCRIPTION OF THE PREFERRED EXEMPLARY EMBODIMENT(S)

Figure 1:
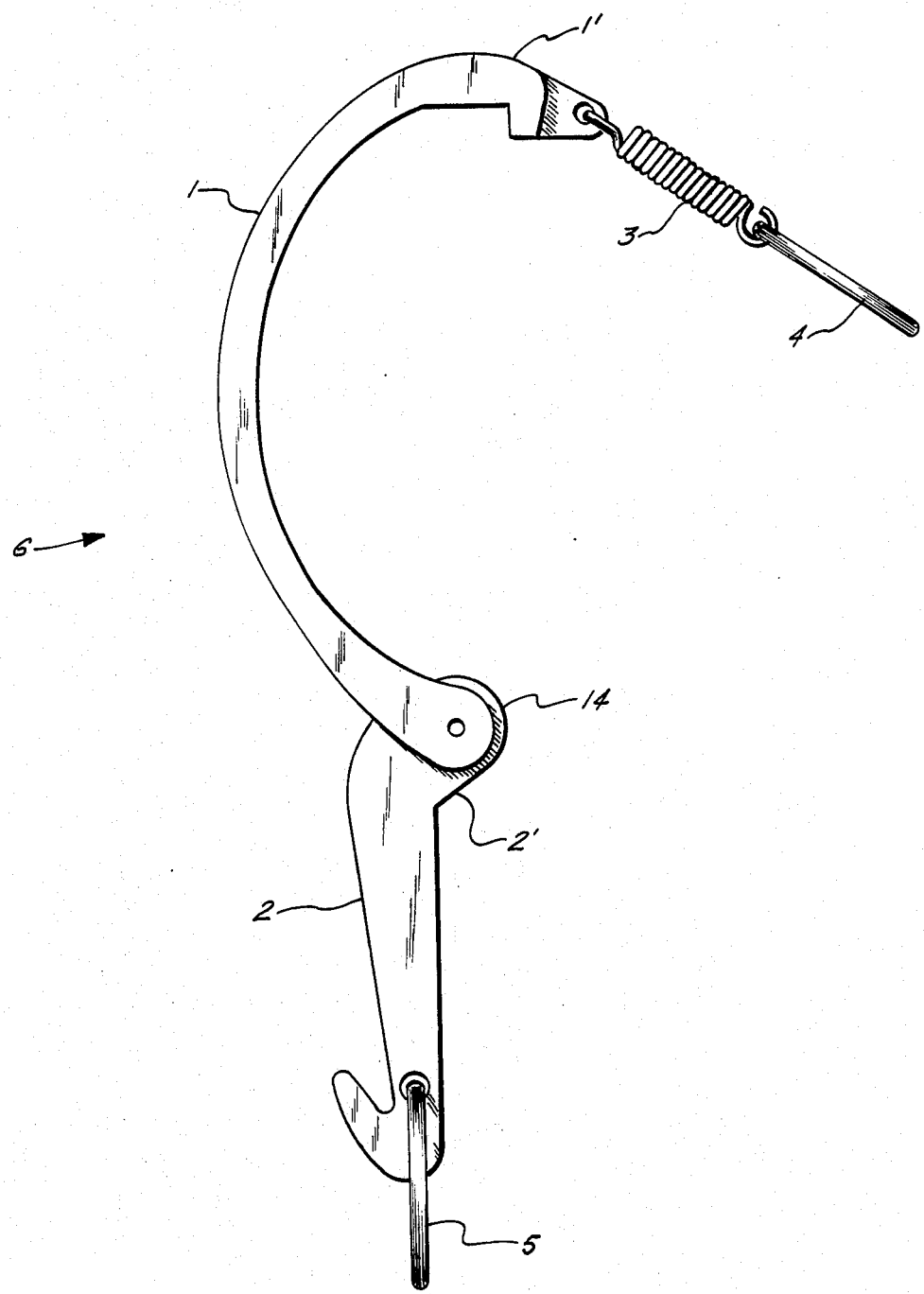
FIG. 1 is a top view of the preferred embodiment of the present invention in its open configuration.
Figure 5:
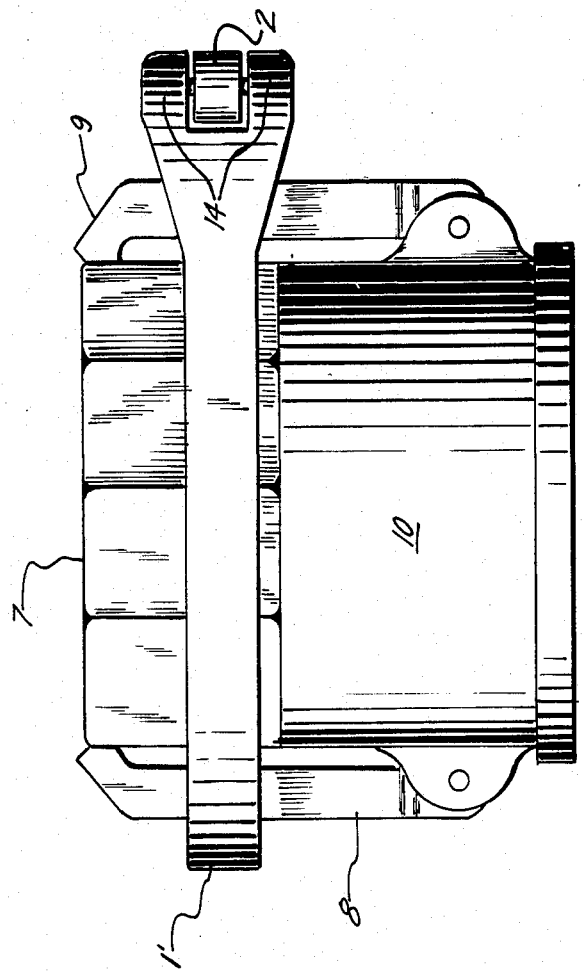
FIG. 5 is a back elevational view of the main body of the preferred embodiment of the present invention in securing engagement with the body of a coupling of the prior art.
Figure 4:
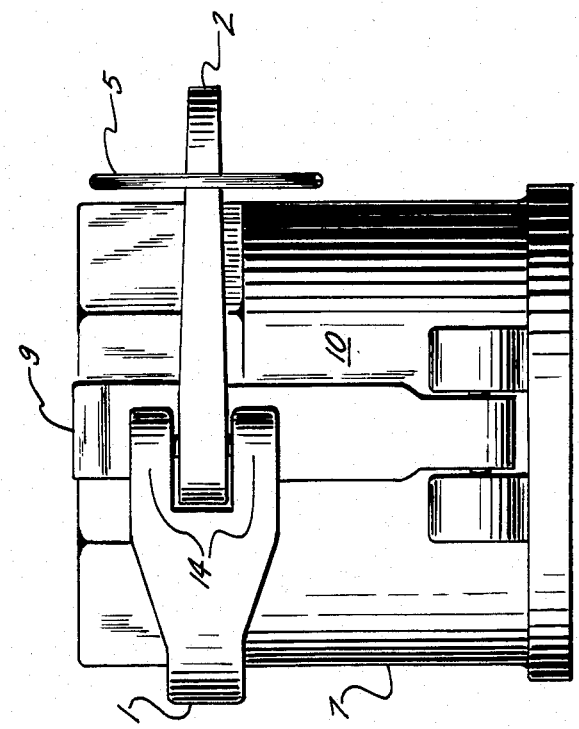
FIG. 4 is a left side elevational view of the preferred embodiment of the present invention showing the pivital point of the present invention in securing engagement with a lever arm of a coupling of the prior art.
Figure 6:
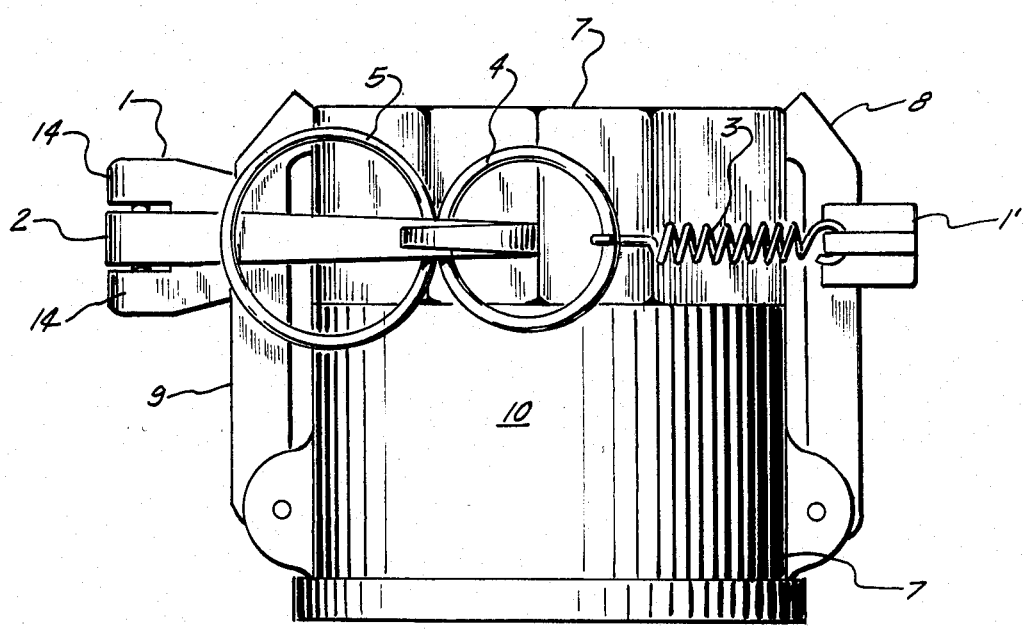
FIG. 6 is a front elevational view of the locking mechanism of the preferred embodiment of the present inventon in its locked position about a coupling of the prior art.
Figure 7:
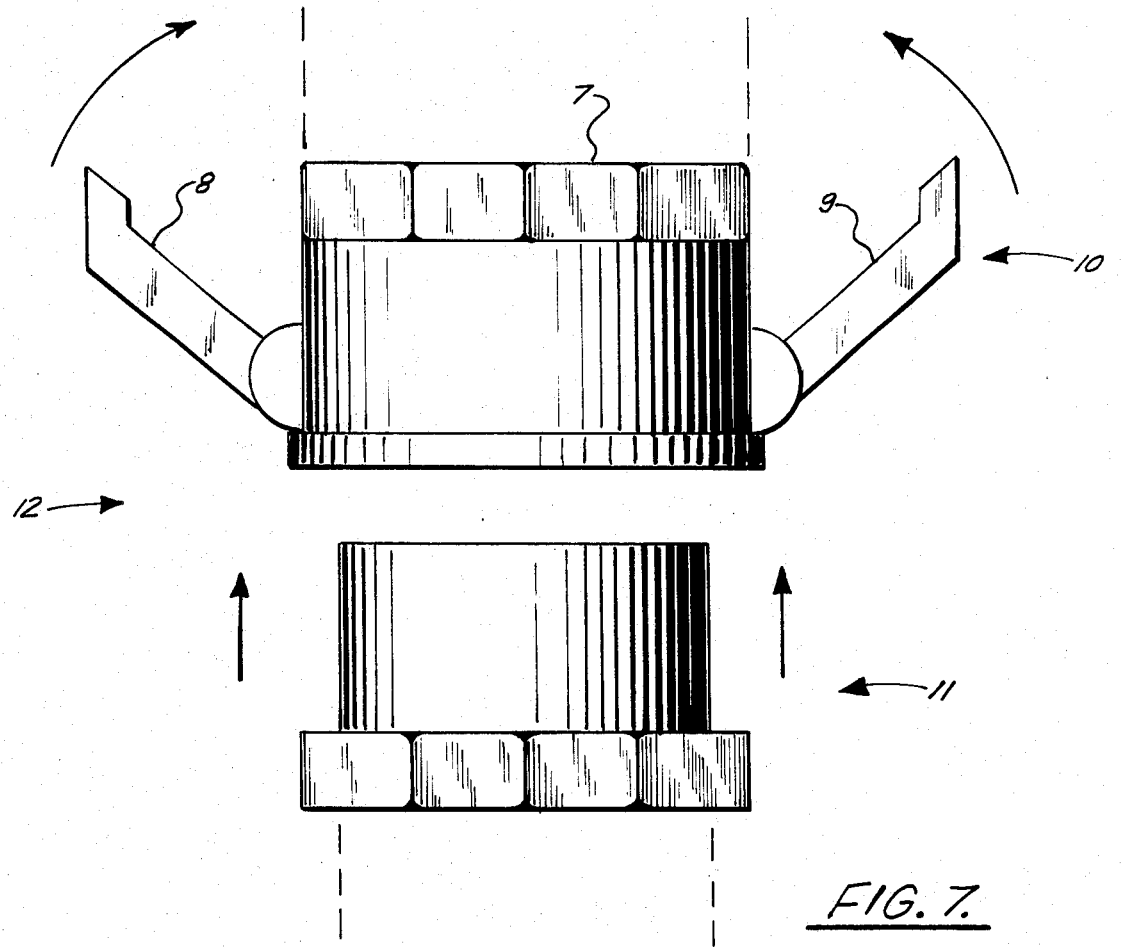
FIG. 7 is a simplified view of the two, male/female portions of a prior art quick connect coupling with their pipe sections shown in phantom line.

The preferred embodiment of the safety clamp of the present invention, as shown in FIG. 1, comprises an extended, rigid, body element 1, an extended, rigid, pivoting clamp arm 2, a resilient spring 3, a securing ring 4, and a pull ring 5. FIG. 1 shows the clamp 6 in its open configuration ready to be positioned around the socket portion 10 of a standard, prior art coupling 12 such as that illustrated in FIG. 7.

The socket portion 10 of the prior art hose or pipe coupling includes a housing 7 and lever arms 8 and 9 shown in FIGS. 2 through 7. When the female, socket portion 10 of one pipe section is coupled with the male, plug portion 11 of the other pipe section to which is is to be connected, the lever arms 8 and 9 are moved from a position extending outboard or generally perpendicular to the housing 7 to a position over and parallel with the housing 7, as indicated by the curved arrows in FIG. 7, in order to create a seal between the plug 11 and socket 10. The object of the present invention is to secure the lever arms 8, 9 in this disposition, so that the two halves 10 and 11 of the coupling 12 accidentally do not become disengaged.

FIG. 2 shows the same embodiment of the present invention as FIG. 1 but in its closed, securing configuration, encircling the coupling housing 7 and lever arms 8 and 9. The clamp 6 makes contact with the coupling housing 7 only at points A and B and with the lever arms 8 and 9 only at areas C and D, respectively.

In order to secure the clamp to the housing, the hooked end 1' of the body element 1 of the clamp 6 is positioned around and back against the first lever arm 8, and the pivot hinge 14 of the clamp, particularly arm end 2', is rested against the second lever arm 9, with the approximate center of the body 1 of the clamp contacting the housing 7 at point A.

It is noted that the hooked end 1' contacts the outer and far side, flat, edge surfaces of the lever arm 8 with an "L" shaped type of hooking engagement. Likewise the pivoted end of the arm 2 contacts the outer, flat side of the arm 9 with a flat, face-to-face type of surface engagement terminating at the angled, inner side surface 2', causing the lever arm 9 to be nestled within it between it and the pivoted end of the arm 1. This greatly enhances the locking and natural positioning of the clamp 6 with respect to the coupling socket 10.

The clamp arm 2 is swung inwardly toward the housing 7, until it contacts the housing at point B. At this time the two lever arms 8 and 9 are being held firmly in place against the housing 7 from the pressure being applied at the contact surfaces C and D.

As can be seen in FIG. 2, the body element 1 and pivoting clamp arm 2 in position around and about the generally circular socket coupling 10 extends about approximately two hundred and seventy-five degrees of its periphery, leaving a gap between the non-pivoting ends of the body element 1 and the extended arm 2.

The clamp 6 is then secured in this configuration across the gap, and the pressure at areas C and D is maintained, by hooking the securing ring 4 over and down onto the hooked end of the clamp arm 2. This extends the spring 3, which maintains a biasing, closing pressure between the ends of the body 1 and the clamp arm 2, thereby biasing and locking the entire clamp 6 in a closed configuration, safety securing the lever arms 8 and 9 in place against the housing 7.

When it is desired to disengage the socket 10 of the first pipe section from the plug 11 of the second pipe section, the safety clamp 6 is removed by pulling down on the spring ring 4, disengaging it out of the hooked end of the arm 2 against the biasing force of the spring 3. The clamp 6 can then be taken off or will fall off the coupling socket 10, allowing the coupling lever arms 8, 9 to be pulled out, and the plug 11 removed out of the socket 10.

Although the details illustrated and described are preferred, the invention is subject to many different embodiments and variations. Because many varying and different embodiments may be made within the scope of the inventive concept herein taught, and because many modifications may be made in the embodiment herein detailed in accordance with the descriptive requirements of the law, it is to be understood that the details herein are to be interpreted as illustrative and not in a limiting sense.

What is claimed is:

1. A supplemental clamp system for a pipe coupling, which is at least generally circular and is locked together by at least one longitudinally positionable lever arm, comprising:

a semi-circluar, extended body element;

an extended arm pivotally mounted at one end to said body element at one end thereof and being substantively shorter in length about the pipe coupling than said extended body element, the body element extending around at least one hundred and eighty degrees of the periphery of the circular pipe coupling and said arm extending around less than one hundred and eighty degrees, said body element and said arm in combined length being positionable around and about approximately two hundred and seventy degrees of the periphery of the pipe coupling including the level arm(s), with a gap between their ends; and biasing means connectable between the other ends of said body element and said arm across the gap for keeping said body element and arm in contact with the lever arm(s), further locking the coupling closed as a supplement to the locking action of the lever arm(s).

2. A supplemental clamp system for a pipe coupling, which is at least generally circular and is locked together by at least one longitudinally positionable lever arm, comprising:

a semi-circular, extended body element;

an extended arm pivotally mounted at one end to said body element at one end thereof, said body element and said arm being positionable around and about approximately two hundred and seventy degrees of the periphery of the pipe coupling including the lever arm(s), with a gap between their ends; and biasing means connectable between the other ends of said body element and said arm across the gap for keeping said body element and arm in contact with the lever arm(s), locking the coupling closed;

said body element having a first hooked end for engaging the lever arm of the coupling, and a second pivoted end pivotally mounting said body element on said arm.

3. The clamp system of claim 2, wherein:

said arm has a first end pivotally mounted to said body element, and a second hooked end for receiving one end of said biasing means.

4. The clamp system of claim 2, wherein:

said biasing means comprises a spring having rounded ends for connecting to said body element and said arm.

5. The clamp system of claim 1, wherein:

said arm has a first end pivotally mounted to said body element, and a second hooked end for receiving one end of said biasing means.

6. The clamp system of claim 1, wherein:

said biasing means comprises a spring having rounded ends for connecting to said body element and said arm.

7. A supplemental clamp system for further securing a cam-action, quick connect, circular coupling, comprising:

two pivoted lever arms having a cam-action initially locking the coupling together, said arms being located on opposite sides of the coupling spaced one hundred and eighty degrees from one another;

a semi-circular body element having a first hooked end contacting one of said lever arms in a hooked engagement, and a second hinged end spaced from one another by about at least one hundred and eighty degrees about the periphery of the coupling and extending from one lever arm to the other;

an arm having a first end pivotally mounted to said hinged end of said body element forming a pivot hinge and a second hooked end; and extended biasing means, having ends attachable to said first hooked end of said body element and said second hooked end of said arm, for keeping said body element and said arm together in contact with the closed lever arms.

8. The clamp system of claim 7, wherein:

said first end of said body element contacts the first lever of said coupling, said pivot hinge formed by said second end of said body element and said first end of said arm contacts the second lever arm of the coupling; and said clamp is held in contact with the closed lever arms by the biasing force of said biasing means connected between said first end of said body element and said second end of said arm.

9. The clamp system of claim 8, wherein:

the approximate center of said body element contacts the housing of said coupling approximately midway between the closed lever arms.

10. A supplemental clamp system for further securing the closed lever arms of a cam-action, quick connect, circular coupling, comprising:

a semi-circular body element having a first hooked end and a second hinged end;

an arm having a first end pivotally mounted to said hinged end of said body element forming a pivot hinge and a second hooked end; and extended biasing means, having ends attachable to said first hooked end of said body element and said second hooked end of said arm, for keeping said body element and said arm together in contact with the closed lever arms;

said body element and said arm having portions with flat surfaces on their inner sides which are engageable in face-to-face surface area contact with the outer side surfaces of the two closed lever arms.

11. The clamp system of claim 10, wherein at least one of said area contacts further includes at least a generally "L" shaped hooking engagement with the outer side and the far side of one of the lever arms.

12. The clamp system of claim 10, wherein:

said first end of said body element contacts the first lever of said coupling, said pivot hinge formed by said second end of said body element and said first end of said arm contacts the second lever arm of the coupling; and said clamp is held in contact with the closed lever arms by the biasing force of said biasing means connected between said first end of said body element and said second end of said arm.

13. The clamp system of claim 12, wherein:

the approximate center of said body element contacts the housing of said coupling approximately midway between the closed lever arms.

14. The method of resiliently and supplementally locking the lever arms closed on a cam-action, quick connect pipe coupling, comprising the following steps:

(a) providing a supplemental clamp system, including— an extended, semi-circular body element having a first hooked end and a second hinged end, an extended arm having a first end, pivotally mounted to said hinged end of said body element forming a pivot hinge, and a second hooked end, and a biasing means having ends attachable to said first hooked end of said body element and said second hooked end of said arm; and (b) clamping said supplemental clamp system about the closed lever arms of the pipe coupling, with said first hooked end contacting one of said lever arms in hooked engagement, further locking them together.

* * * * *